(12) United States Patent
Sugiyama et al.

(10) Patent No.: US 9,709,457 B2
(45) Date of Patent: Jul. 18, 2017

(54) METHOD OF DETECTING DEFECTS IN HONEYCOMB STRUCTURAL BODY

(71) Applicant: DENSO CORPORATION, Kariya, Aichi-pref. (JP)

(72) Inventors: Tomio Sugiyama, Nagoya (JP); Yasushi Miyamura, Mie-ken (JP); Hiromi Inada, Tsu (JP); Kouji Hori, Kuwana (JP); Kazuo Matsubara, Kuwana (JP)

(73) Assignee: DENSO CORPORATION, Kariya (JP)

( * ) Notice: Subject to any disclaimer, the term of this patent is extended or adjusted under 35 U.S.C. 154(b) by 128 days.

(21) Appl. No.: 14/329,407

(22) Filed: Jul. 11, 2014

(65) Prior Publication Data

US 2015/0013435 A1 Jan. 15, 2015

(30) Foreign Application Priority Data

Jul. 11, 2013 (JP) .................................. 2013-145477

(51) Int. Cl.
*G01M 3/24* (2006.01)
*B01D 46/24* (2006.01)
*F01N 3/00* (2006.01)

(52) U.S. Cl.
CPC ........... *G01M 3/24* (2013.01); *B01D 46/2418* (2013.01)

(58) Field of Classification Search
CPC G01M 3/00; G01M 3/04; G01M 3/24; G01N 15/00; G01N 15/08; G01N 29/00; G01N 29/48; B01D 46/00; B41D 46/24; B41D 46/2418; F01N 3/00; F01N 3/20
See application file for complete search history.

(56) References Cited

U.S. PATENT DOCUMENTS

| | | | |
|---|---|---|---|
| 4,491,013 A * | 1/1985 | Bubik | G01M 3/24 73/146 |
| 5,102,434 A | 4/1992 | Hijikata et al. | |
| 5,581,017 A | 12/1996 | Bejtlich, III | |
| 5,675,506 A * | 10/1997 | Savic | F17D 5/06 702/51 |
| 6,553,809 B1 * | 4/2003 | Hayward | G01N 29/045 73/40.5 A |
| 7,849,747 B2 * | 12/2010 | Owens | B01D 46/0086 73/598 |

(Continued)

FOREIGN PATENT DOCUMENTS

| | | | | |
|---|---|---|---|---|
| FR | 2606877 A1 * | 5/1988 | ............ | G01M 3/24 |
| GB | 2346974 A * | 8/2000 | ............ | G01M 3/24 |

(Continued)

*Primary Examiner* — Nguyen Ha
(74) *Attorney, Agent, or Firm* — Nixon & Vanderhye P.C.

(57) ABSTRACT

In a method of detecting defects generated in a honeycomb structural body, both end sections of the honeycomb structural body is sealed along a flowing direction of exhaust gas. Air is supplied in the flowing direction of the exhaust gas from one end section to the other end section of the honeycomb structural body. Microphones are arranged at outer periphery of the honeycomb structural body and detect sounds of air leaking from a skin layer of the honeycomb structural body. A judgment step judges whether or not defects such as holes having not less than a predetermined diameter and cracks are generated on the basis of a magnitude of the detected sounds of the leaking air.

9 Claims, 6 Drawing Sheets

(56) References Cited

U.S. PATENT DOCUMENTS

| | | |
|---|---|---|
| 2004/0000186 A1 | 1/2004 | Hagg et al. |
| 2007/0266790 A1 * | 11/2007 | Gunasekaran ..... B01D 46/2418 |
| | | 73/624 |
| 2008/0173071 A1 * | 7/2008 | Park ................... B01D 46/2418 |
| | | 73/38 |
| 2010/0268489 A1 * | 10/2010 | Lie ........................ E21B 47/101 |
| | | 702/51 |
| 2012/0247224 A1 | 10/2012 | Miyashita et al. |

FOREIGN PATENT DOCUMENTS

| | | | |
|---|---|---|---|
| JP | 58-155343 | 9/1983 | |
| JP | 05-000658 | 1/1993 | |
| JP | 09-145647 | 6/1997 | |
| JP | 2001-201465 | 7/2001 | |
| JP | 3571084 | 7/2004 | |
| JP | 2005-530957 | 10/2005 | |
| JP | 3775599 | 3/2006 | |
| JP | 2006-106011 | 4/2006 | |
| JP | 2008-070235 | 3/2008 | |
| JP | 2008-139053 | 6/2008 | |
| JP | 2009-085673 | 4/2009 | |
| JP | 2009-115655 | 5/2009 | |
| JP | 2010025715 A * | 2/2010 | .............. G01M 3/24 |
| JP | 2010-237101 | 10/2010 | |
| JP | 2012-208040 | 10/2012 | |
| WO | WO 9411721 A1 * | 5/1994 | ............. G01N 15/08 |

\* cited by examiner

METHOD OF DETECTING DEFECTS IN HONEYCOMB STRUCTURAL BODY

CROSS-REFERENCE TO RELATED APPLICATION

This application is related to and claims priority from Japanese Patent Application No. 2013-145477 filed on Jul. 11, 2013, the contents of which are hereby incorporated by reference.

BACKGROUND OF THE INVENTION

1. Field of the invention

The present invention relates to methods of detecting defects formed in a skin layer of a honeycomb structural body having a structure in which a plurality of cells is formed by cell walls and the skin layer having a cylindrical shape covers the outer peripheral surface of the honeycomb structural body.

2. Description of the Related Art

Honeycomb structural bodies are widely known and used as supporting bodies which support catalysts capable of purifying exhaust gas emitted from internal combustion engines mounted to motor vehicles, etc. Such a honeycomb structural body is made of porous ceramics. In general, a honeycomb structural body has a plurality of cells and a skin layer of a cylindrical shape. The cells are surrounded by cell walls. The cell walls are arranged to form the cells so that each of the cells has a polygonal shape and is uniformly arranged when observed from a cross section of the honeycomb structural body which is perpendicular to an axial direction of the honeycomb structural body, i.e. a flow direction of exhaust gas. The honeycomb structural body having the structure previously described is mounted on the inside of an exhaust gas pipe through which exhaust gas emitted from an internal combustion engine flows. Because the exhaust gas emitted from an internal combustion engine has a high temperature, when the exhaust gas is supplied to the inside of the honeycomb structural body, the exhaust gas activates catalysts supported in the honeycomb structural body. As a result, catalyst reaction occurs and this purifies the exhaust gas. The purified exhaust gas is discharged to the outside of the exhaust gas pipe.

It is strongly requested for a honeycomb structural body to have no defects such as holes. There has been developed and widely used various detection methods of detecting presence of defects generated in a honeycomb structural body. For example, there is a conventional detection method of defecting defects generated in a ceramic filter such as a honeycomb structural body capable of capturing fine particles contained in exhaust gas emitted from a diesel engine. The ceramic filter is burned to eliminate the captured fine particles. This makes it possible to enable repetitive use of the ceramic filter. The detection method supplies compressed air to an inlet side of the ceramic filter. One or more acoustic sensors detect sound of leakage of the air at an outlet side of the ceramic filter in order to detect the presence of defects formed in the ceramic filter. A patent document 1, Japanese unexamined patent application publication (translation of PCT application) No. 2005-530957 discloses such a conventional detection method.

However, the conventional detection method previously described cannot detect defects generated in a skin layer of the ceramic filter as a honeycomb structural body. When defects such as cracks and holes are generated in the skin layer of the ceramic filter, catalysts supported in the inside of the ceramic filter are pushed and supplied as leaking catalysts to outside through the defects formed in the skin layer during a catalyst supporting process to support catalysts on the inside of the ceramic filter. This allows an unnecessary amount of catalysts to be consumed on the outer peripheral surface of the honeycomb structural body. Because catalysts are an expensive noble metal, this increases the manufacturing cost of the honeycomb structural body. In addition to this drawback, this causes the honeycomb structural body to have a poor appearance.

SUMMARY

It is therefore desired to provide a method of detecting defects generated in a honeycomb structural body, in particular, defects generated in a skin layer of the honeycomb structural body.

An exemplary embodiment provides a method of detecting defects generated in a honeycomb structural body. The honeycomb structural body is comprised of a plurality of cell walls arranged in a lattice shape and with a skin layer. The cell walls are arranged to form a plurality of cells. Each of the cells has a polygonal shape in a cross section of the honeycomb structural body perpendicular to a gas supply direction. That is, the gas supply direction is parallel to the cells, i.e. a cell formation direction in the honeycomb structural body. An outer peripheral surface of the honeycomb structural body is covered with the skin layer. The method has a step of sealing both end sections of the honeycomb structural body, a step of supplying gas from one end section to the other end section of the honeycomb structural body, a step of detecting sounds of gas leaking from the skin layer of the honeycomb structural body by using one or more microphones arranged at an outer periphery of the skin layer, and a step of judging a presence of defects such as holes having a predetermined diameter and cracks generated in the skin layer on the basis of a magnitude of the detected sounds of the leaking gas.

In the method of detecting defects generated in the honeycomb structural body, both the detection step and the judging step perform a defect inspection which detects a presence of defects generated in the skin layer of the honeycomb structural body. During the detection step, both the end sections of the honeycomb structural body are sealed. A compressed gas such as air is supplied from one end section to the other end section of the honeycomb structural body so that the compressed gas is forcedly flowing in the inside of the cells of the honeycomb structural body. Because the honeycomb structural body is made of porous ceramics, the supplied air can pass through the cell walls and porous formed in the skin layer and leaks from the skin layer to the outside of the honeycomb structural body. One or more microphones are arranged around the outer periphery of the skin layer of the honeycomb structural body. These microphones detect air leaking from the skin layer. When defects such as holes and cracks are generated in the skin layer, a magnitude of sounds of the leaking air becomes large when compared with a magnitude of sounds of the leaking air when the honeycomb structural body has no defects. The judgment step judges the presence of such defects on the basis of an amount or a magnitude of the air leaking from the skin layer. It is possible for the method according to the present invention to correctly detect defects such as holes and cracks generated in the skin layer of the honeycomb structural body.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
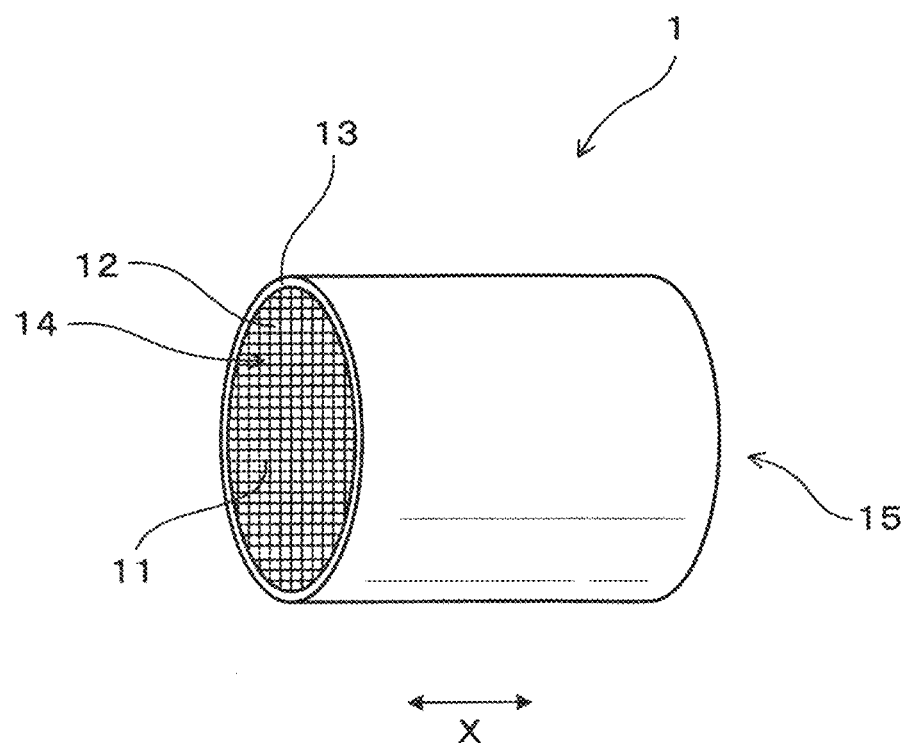
FIG. 1 is a perspective view showing a honeycomb structural body as a detection target by a method according to an exemplary embodiment of the present invention.

Hereinafter, various embodiments of the present invention will be described with reference to the accompanying drawings. In the following description of the various embodiments, like reference characters or numerals designate like or equivalent component parts throughout the several diagrams.

A description will be given of the method of detecting defects of the honeycomb structural body according to a preferred exemplary embodiment. In general, a honeycomb structural body is comprised of a skin layer and a plurality of cell walls arranged in a lattice shape. The cell walls are arranged to form a plurality of cells having a polygonal shape in a cross section of the honeycomb structural body. This cross section is perpendicular to the cell formation direction through which a compressed gas such as air is supplied on the inside of the honeycomb structural body during the detection step. The outer peripheral surface of the honeycomb structural body is covered with the skin layer. For example, the cell walls are arranged in a substantially polygonal shape such as a substantially triangle shape, a substantially square shape, a substantially hexagonal shape, or a substantially octagonal shape. Each of the cells is formed extending parallel to an axial direction of the honeycomb structural body and forms an exhaust gas flow passage, through which exhaust gas emitted from an intern& combustion engine flows when the honeycomb structural body is mounted to an exhaust gas pipe. In general, the skin layer has a substantially polygonal-cylinder shape, i.e. a cylindrical shape. It is also possible for the skin layer to have a substantially prism shape.

In a method of producing a honeycomb structural body as the inspection target, raw material powder such as ceramics with organic binder, lubricant, binder, etc. are mixed and kneaded together to make raw material. The raw material is extruded and molded to have a predetermined shape. The molded body is dried and fired. Further, catalysts such as noble metal catalysts, etc. are supported in the honeycomb structural body. By detecting the presence of defects generated in a honeycomb structural body processed by the firing step before performing a step of supporting catalysts, it is possible for the method according to the present invention to detect the presence of defects generated in a honeycomb structural body after the completion of the step of supporting catalysts. In general, the honeycomb structural body made of porous ceramics has an average pore size of not less than 20 μm and a porosity within a range of 20 to 45%. It is possible to detect an average pore size and a porosity of a honeycomb structural body by using a mercury porosimetry on the basis of a mercury penetration method.

The method according to the present invention detects defects such as holes and cracks generated in a honeycomb structural body. Such defects are generated in the skin layer of the honeycomb structural body during its manufacturing process. The method according to the present invention can detect defects having a diameter of not less than 0.05 mm, for example. Further, it is possible for the method according to the present invention to more reliably detect defects having a diameter of not less than 0.07 mm. The method according to the present invention uses a diameter of a defect which indicates a diameter of a circle when the exterior of the defect has a circular shape, and a diameter of a circle having the same area of the defect when the defect is not a circular shape.

In the detection step in the method according to the present invention, a plurality of microphones is arranged along the cell formation direction around the outer periphery of the skin layer of a honeycomb structural body. It is preferable for the judgment step to compare an amount or a magnitude of detected sounds of gas, for example air leaking from the skin layer to defect the presence of defects generated in the skin layer of the honeycomb structural body while performing a relative rotation between the honeycomb structural body and the microphones. The detection process and the judgment process make it possible to detect the presence of defects around the entire of the skin layer of the honeycomb structural body. Because gas leaking from defects such as holes and cracks generated in the skin layer has sounds which are larger than sounds of air leaking from a skin layer without any defect. The method according to the present invention detects the presence of defects on the basis of a change of a relative magnitude or a relative amount of the detected sounds of the leaking air while the relative rotation is performed between the honeycomb structural body and the microphones. The method according to the present invention can reliably detect the presence of defects generated in the skin layer on the basis of an amount or a magnitude of sounds of the leaking air even if a pressure of gas to be supplied to a honeycomb structural body is varied, and constant outside noise is generated.

It is further possible to rotate one of the honeycomb structural body and the microphones during the detection step. For example, the honeycomb structural body only is rotated around its central axis which is parallel to the cell formation direction, i.e. the cells formed in the honeycomb structural body. Exhaust gas is flowing in the cells of the honeycomb structural body in order to purify the exhaust gas when the honeycomb structural body is mounted to an exhaust gas pipe through which exhaust gas emitted from an internal combustion engine (not shown) flows. Further, it is also possible to rotate the microphones in a circumferential direction around the skin layer of the honeycomb structural body. It is preferable to rotate the honeycomb structural body around its central axis and for the stationary microphones detect sounds of gas such as air leaking from the skin layer of the honeycomb structural body in order to perform the easy detection step in the method according to the present invention.

In the detection step, air, i.e. compressed air is supplied to the inside of the honeycomb structural body. It is possible to supply the air having a constant pressure or to supply the air at predetermined time intervals or irregular intervals. That is, it is possible to supply air pulses to the inside of the honeycomb structural body. It is possible to use non-reactive gas with raw material such as cordierite, silicon carbide, silicon nitride, alumina, silica, titanium dioxide, etc. which form the honeycomb structural body. It is preferable to use air as the non-reacted gas.

First Exemplary Embodiment

A description will now be given of the method of detecting defects generated in a honeycomb structural body 1 according to an exemplary embodiment with reference FIG. 1 to FIG. 6.

FIG. 1 is a perspective view showing the honeycomb structural body 1 which is a target of the defect detection process performed by the method according to the exemplary embodiment. As shown in FIG. 1, the honeycomb structural body 1 is comprised of a plurality of cell walls 11 arranged in a substantially lattice shape and a skin layer 13. The cell walls 11 are arranged to form a plurality of cells 12. Each of the cells 12 has a polygonal shape in a cross section of the honeycomb structural body 1 perpendicular to a gas supply direction X. An outer peripheral surface of the honeycomb structural body 1 is covered with the skin layer 13. The method according to the exemplary embodiment detects defects generated in the skin layer 13 of the honeycomb structural body 1. The method according to the exemplary embodiment uses a honeycomb structural body having a structure in which cell walls 11 are arranged to form the cells 12 and a cross section of each of the cells 12 has a substantially square shape, where the cross section is perpendicular to the gas supply direction X.

The method according to the exemplary embodiment performs a detection step and a judgment step in order to detect defects generated in the skin layer 13 of the honeycomb structural body 1.

Figure 4:
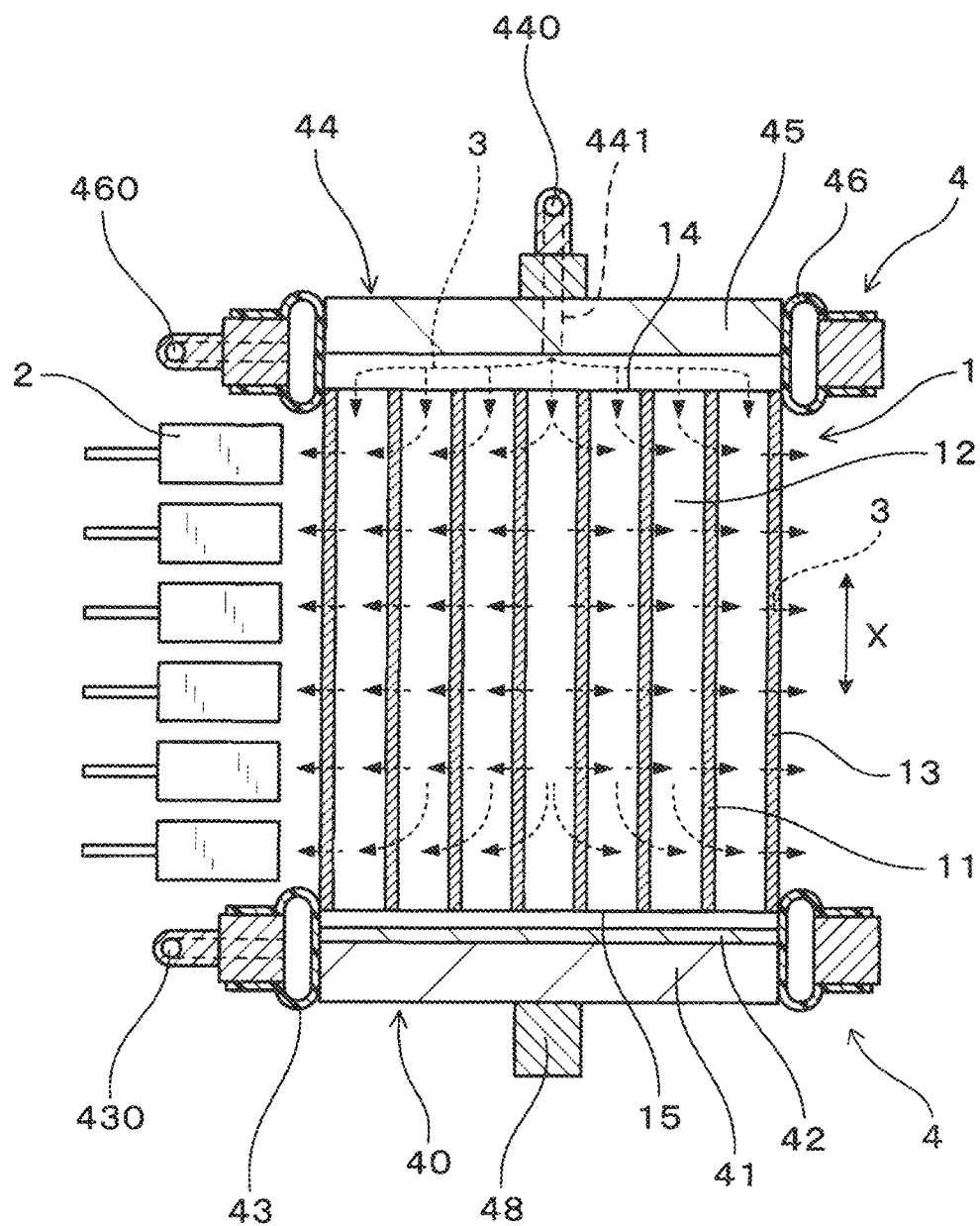
FIG. 4 is a view showing a cross section of the honeycomb structural body fixed to the chuck device to be used during the defect defection step performed by the method according to the exemplary embodiment of the present invention.

FIG. 4 is a view showing a cross section of the honeycomb structural body 1. As shown in FIG. 4, the honeycomb structural body 1 is fixed to a chuck device 4 which is used by the method according to the exemplary embodiment. In the detection step, both the end sections 14 and 15 of the honeycomb structural body 1, viewing along the gas supply direction X, are sealed and gas 3 such as air is supplied to the inside of the honeycomb structural body 1 from one end section 14 to the other end section 15 of the honeycomb structural body 1. The detection step detects sounds of gas 3 leaking from the skin layer 13 by using microphones 2. The microphones 2 are arranged along the outer periphery of the skin layer 13 of the honeycomb structural body 1. The judgment step judges whether or not defects having not less than a predetermined diameter are present in the skin layer 13 on the basis of a magnitude of the detected sounds of the gas 3 leaking from the skin layer 13.

Specifically, the honeycomb structural body 1 shown in FIG. 1 was prepared as a detection target having holes as defects formed in the skin layer 13. The hole has a substantially circular shape and is penetrated in the skin layer 13. The holes were formed in the skin layer 13 by using a drill.

The method according to the exemplary embodiment used test examples 1 to 4 as the honeycomb structural body 1 in which the holes as defects having a different shape were formed. The method according to the exemplary embodiment further used a comparison example 5 which has no hole as defects in its skin layer. The honeycomb structural body 1 according to the test examples 1 to 4 and the comparison example 5 has a cylindrical shape and a diameter $\phi$ of 80 mm, an axial length L of 95 mm, a volume of 500 cc, a porosity of 32%, an average pore size of 6 μm and the skin layer 13 having a thickness of 0.35 mm.

Next, the honeycomb structural body 1 as each of the test examples 1 to 4 and the comparison example 5 was fixed to the chuck device 4 which corresponds to a balloon chuck device equipped with balloons. It is possible to fill the balloons in the balloon chuck device with various types of gases such as air, carbon dioxide $CO_2$ etc. For example, it is possible to use an air balloon chuck device 4 equipped with air balloons 43 and 46 at the upper side and the lower side of the chuck device 4. The air balloons 43 and 46 are filled with air.

Figure 2:
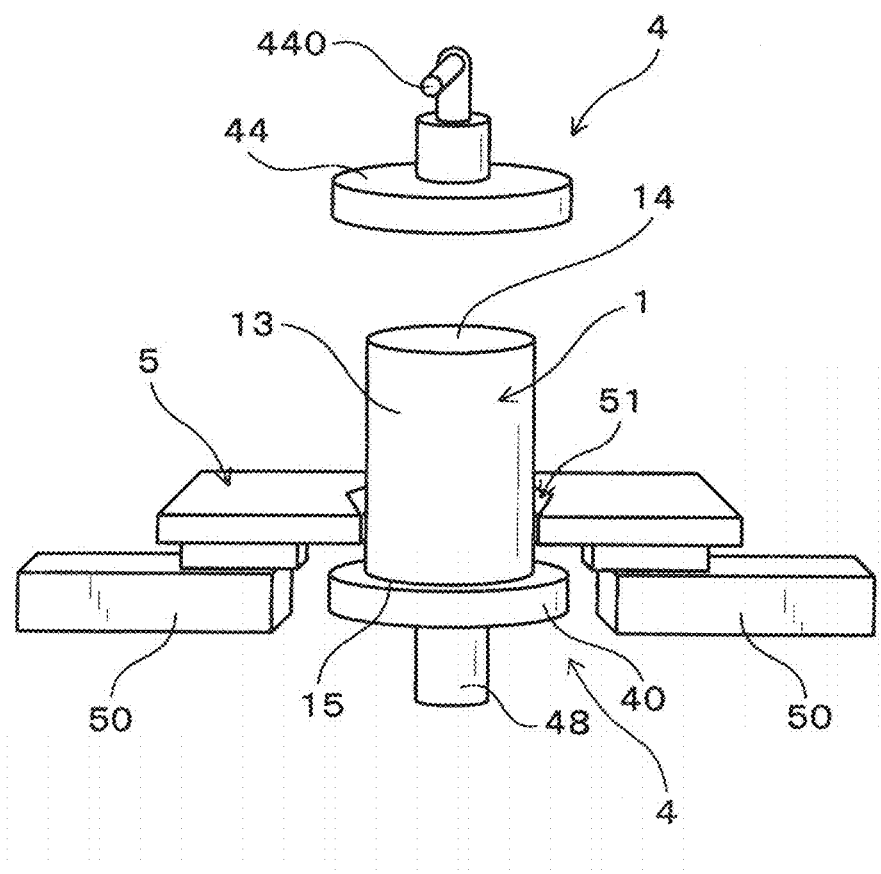
FIG. 2 is a schematic view showing a centering tool and a chuck device to be used during the defect defection step performed by the method according to the exemplary embodiment of the present invention, in which a lower-side fixing tool of the chuck device holds and fixes an end section of the honeycomb structural body.
Figure 3:
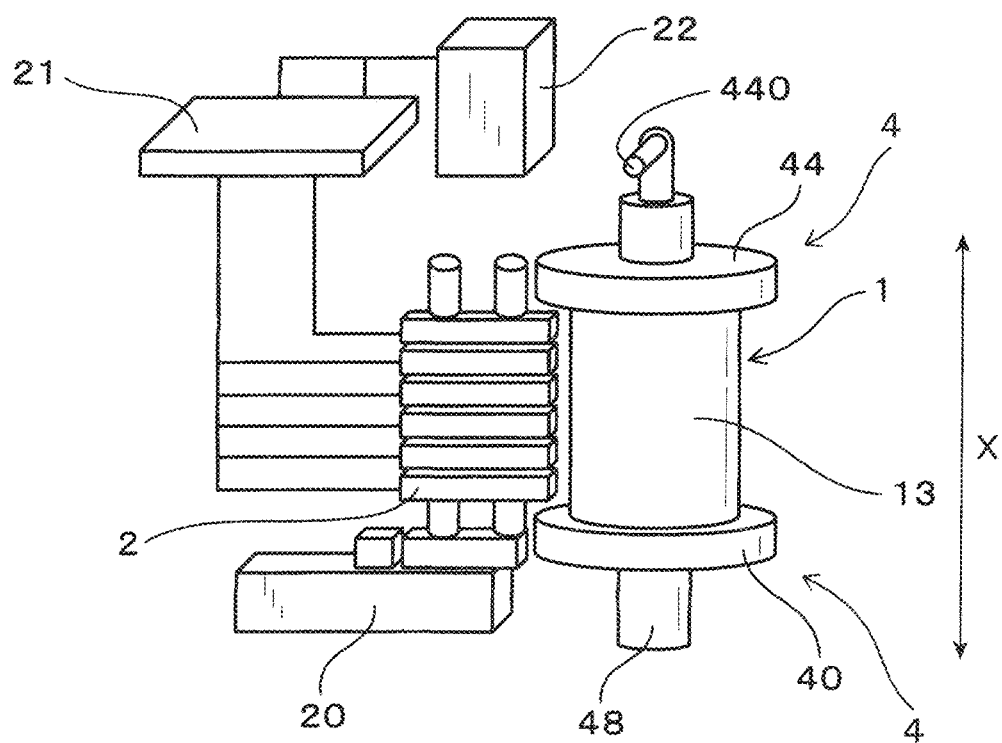
FIG. 3 is a schematic view showing the chuck device to be used during the defect defection step performed by the method according to the exemplary embodiment of the present invention, which holds and fixes the honeycomb structural body between an upper-side fixing tool and the lower-side fixing tool of the chuck device.
Figure 5:
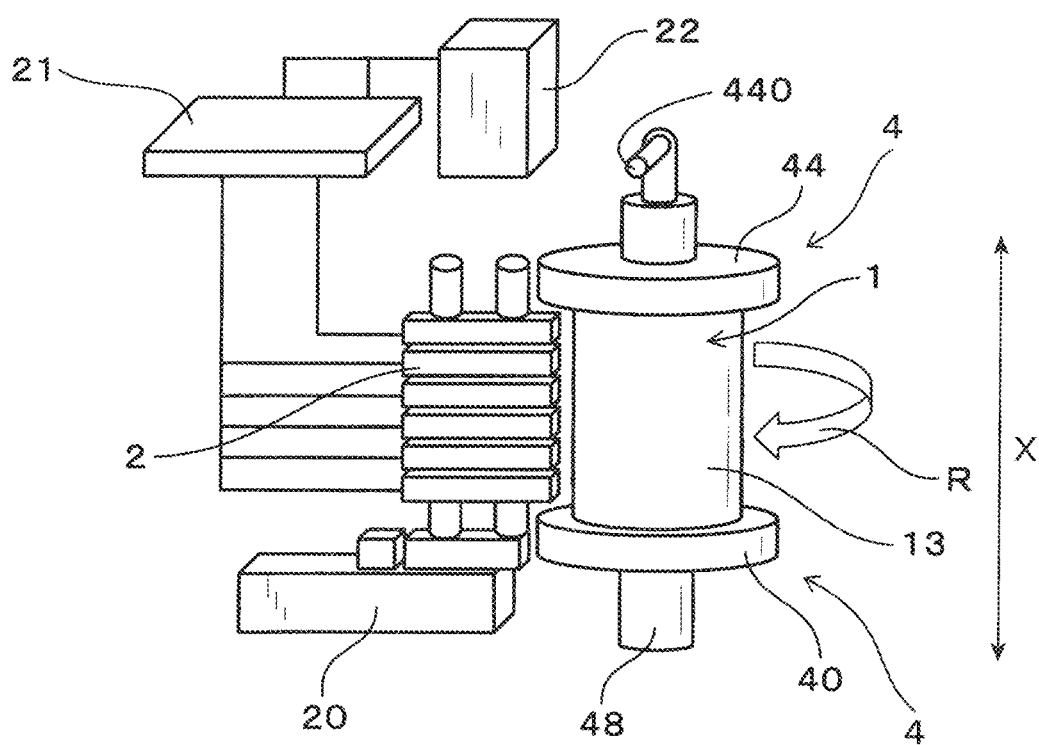
FIG. 5 is a schematic view showing the honeycomb structural body which is fixed to the chuck device and rotated during a detection step in the method according to the exemplary embodiment of the present invention.

FIG. 2 is a schematic view showing a centering tool 5 and the chuck device 4 used by the method according to the exemplary embodiment. As shown in FIG. 2, a lower-side fixing tool 40 of the chuck device 4 holds and fixes an end section of the honeycomb structural body 1. FIG. 3 is a schematic view showing the chuck device 4 used by the method according to the exemplary embodiment. The chuck device 4 holds and fixes the honeycomb structural body 1 between an upper-side fixing tool 44 and the lower-side fixing tool 40 of the chuck device 4. FIG. 5 is a schematic view showing the honeycomb structural body 1 fixed to the chuck device 4 and rotated during the detection step in the method according to the exemplary embodiment.

The air balloons 43 and 46 in the chuck device 4 are omitted from FIG. 2, FIG. 3, FIG. 5, and FIG. 6 for brevity. The air balloons 43 and 46 in the chuck device 4 are shown only in FIG. 4.

As shown in FIG. 2, FIG. 3 and FIG. 4, the honeycomb structural body 1 was fixed to the chuck device 4 equipped with the air balloons 43 and 46 at the upper side and the lower side of the chuck device 4. FIG. 2, FIG. 3 and FIG. 5 show a schematic perspective view of the chuck device 4. FIG. 4 shows a cross section of the honeycomb structural body 1 (which corresponds to the exemplary examples 1 to 4 and the comparison example 5) fixed to the chuck device 4.

Specifically, as shown in FIG. 2, the central axis of the honeycomb structural body 1 was aligned to the center of the lower-side fixing tool 40 by using the centering tool 5. After this, the end section 15 of the honeycomb structural body 1 in the axial direction (i.e. the gas supply direction X) thereof was fitted to the lower-side fixing tool 40 of the chuck device 4. The centering tool 5 has a groove 51 having a substantially character V shape (the V shaped groove 51). The honeycomb structural body 1 was fitted to the V shaped groove 51 from the side of the centering tool 5 in order to align a center of the honeycomb structural body 1 with the centering tool 5. The centering tool 5 is moved by a servo cylinder 50 to fit the honeycomb structural body 1 to the V shaped groove 51 of the centering tool 5.

Further, as shown in FIG. 4, the lower-side fixing tool 40 has a metal disk 41 and a resin layer 42 laminated on the metal disk 41. The air balloon 43 was arranged at the outer periphery of the lower-side fixing tool 40. The resin layer 42 prevents the end section 15 of the honeycomb structural body 1 from being broken when the lower-side fixing tool 40 contacts with the end section 15 of the honeycomb structural body 1. Next, gas such as air was supplied to the inside of the air balloon 43 through an air inlet section 430 of the air balloon 43. The air balloon 43 was thereby inflated. This makes it possible to support the outer periphery of the end section 15 of the honeycomb structural body 1 by the air balloon 43 and fix the end section 15 of the honeycomb structural body 1 to the lower-side fixing tool 40. At this time, the honeycomb structural body 1 was lifted up from the lower-side fixing tool 40 to make a gap within a range of 1 to 5 mm between the end section 15 of the honeycomb structural body 1 and the resin layer 42 of the lower-side fixing tool 40. Furthermore, each of the cells 12 at the end section 15 of the honeycomb structural body 1 was sealed with the air balloon 15.

As shown in FIG. 3 and FIG. 4, a plurality of the microphones 2 arranged in series along the gas supply direction X in the honeycomb structural body 1 was moved to the honeycomb structural body 1 side, i.e. to the outer periphery of the skin layer 13 side by using a servo cylinder 20 so that the microphones 2 are separated from the outer periphery of the skin layer 13 of the honeycomb structural body 1 within a gap having a range of 3 to 10 mm. It is also possible to arrange the microphones 2 so that the microphones 2 were separated from the outer periphery of the skin layer 13 of the honeycomb structural body 1 within a gap having a range of 0 to 5 mm. Further, it is possible to determine the number of the microphones 2 on the basis of the length in the axial direction (i.e. the gas supply direction X) of the honeycomb structural body 1.

Next, as shown in FIG. 3 and FIG. 4, the end section 14 in the axial direction (i.e. the gas supply direction X) of the honeycomb structural body 1 was fitted to the upper-side fixing tool 44 of the chuck device 4. The chuck device 4 has a structure in which the central point of the upper-side fixing tool 44 having substantially a disk shape and the lower-side fixing tool 40 are faced and aligned to each other on its central point. Accordingly, after the end section 14 in the axial direction of the honeycomb structural body 1 is fitted to the lower-side fixing tool 40, it is possible to correctly fit the central axis of the honeycomb structural body 1 having a substantially cylindrical shape to the central point of the upper-side fixing tool 44, without performing any alignment step, by lowering the upper-side fixing tool 44 onto the end section 14 in the axial direction of the honeycomb structural body 1.

As shown in FIG. 4, the upper-side fixing tool 44 is comprised of substantially a disk plate made of metal (I.e. a metal disk plate 45) and the air balloon 46 arranged at the outer periphery of the metal disk plate 45. Air was supplied to the inside of the air balloon 46 through its air inlet section 460 in order to inflate the air balloon 46. This makes it possible for the air balloon 46 to support the outer periphery of the end section 14 of the honeycomb structural body 1, and fix the end section 14 of the honeycomb structural body 1 to the upper-side fixing tool 44. At this time, a gap within a range of 1 to 5 mm was formed between the end section 14 of the honeycomb structural body 1 and the metal disk plate 45 of the upper-side fixing tool 44. Furthermore, it is possible to seal each of the cells 12 formed in the honeycomb structural body 1 at the end section 14 of the honeycomb structural body 1 by the inflated air balloon 46. Both the end sections 14 and 15 in the axial direction i.e. the gas supply direction X of the honeycomb structural body 1 were sealed by the above process. The outer periphery of the honeycomb structural body 1 was supported at a pressure within a range of 0.1 to 0.3 MPa by the air balloon 43 of the lower-side fixing tool 40 and the air balloon 46 of the upper-side fixing tool 44.

As shown in FIG. 4, the upper-side fixing tool 44 is comprised of a vent hole 440 and a through hole 441. The through hole 441 communicates with the vent hole 440, i.e. is formed in a thickness direction of the upper-side fixing tool 44.

Next, air (having an air pressure of 0.25 MPa) was supplied continuously to the inside of the upper-side fixing tool 44 through the vent hole 440. Because both the end sections 14 and 15 in the axial direction i.e. the gas supply direction X of the honeycomb structural body 1 was sealed as previously described, the compressed air 3 supplied through the vent hole 440 was transmitted to the inside of the honeycomb structural body 1 from the end section 14 side to the other end section 15 side along the gas supply direction X. The air 3 then passed through the cell walls 11 and the skin layer 13 made of porous ceramics. The air 3 finally leaked from or through the skin layer 13 to the outside of the honeycomb structural body 1.

The microphones 2 arranged around the outer periphery of the skin layer 13 detected sounds leaking from the skin layer 13 of the honeycomb structural body 1. As shown in FIG. 5, the exemplary embodiment rotated the honeycomb structural body 1 having a cylindrical shape around the rotary axis 48 by 370° in the circumferential direction R of the honeycomb structural body 1 in order to perform the sound detection of the whole circumference of the skin layer 13 of the honeycomb structural body 1. A sound mixer 21 collected the sounds of leaking air detected by a plurality of the microphones 2 and a sound level instrument 22 measured a magnitude (dB) of the detected sounds.

Figure 6:
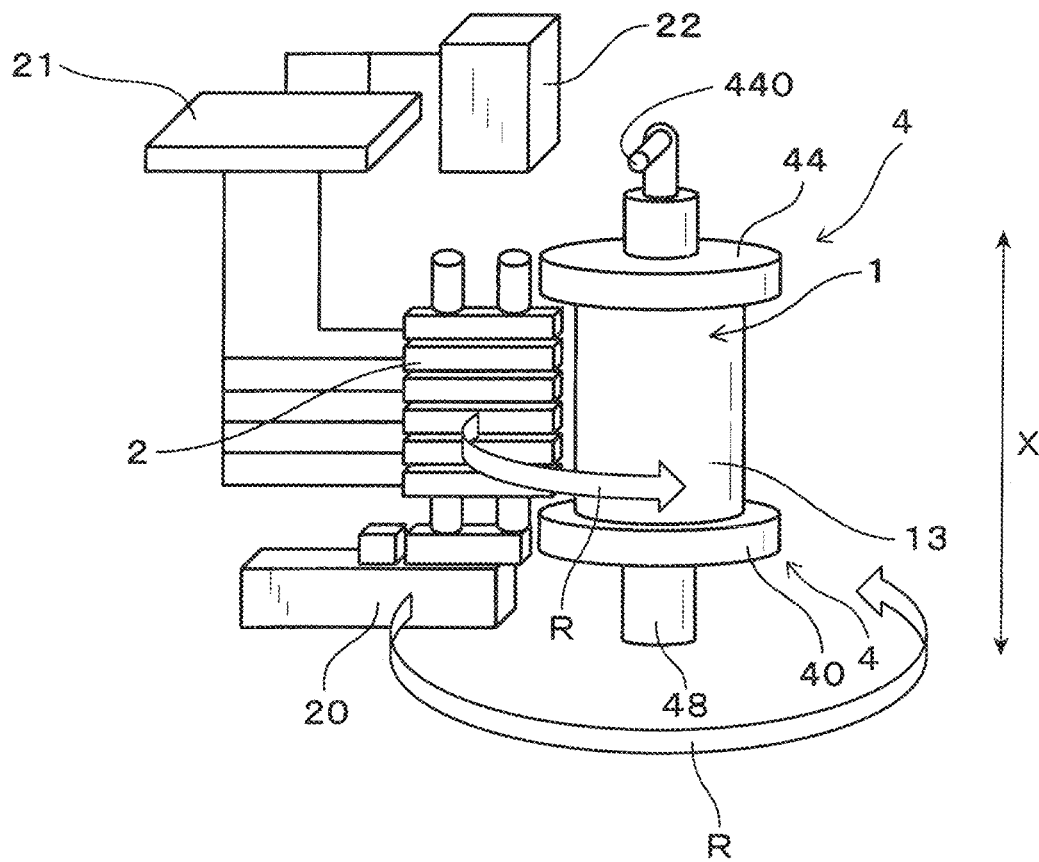
FIG. 6 is a schematic view showing the honeycomb structural body which is fixed to the chuck device and the microphones are rotated around the honeycomb structural body during the detection step in the method according to the exemplary embodiment of the present invention.

FIG. 6 is a schematic view showing the honeycomb structural body 1 which is fixed to the air balloon chuck device 4 and the microphones 2 are rotated around the honeycomb structural body 1 during the detection step in the method according to the exemplary embodiment.

Instead of rotating the honeycomb structural body 1 around the rotary axis 48 as previously described, it is possible for the exemplary embodiment to rotate the microphones 2 around the outer periphery, i.e. the skin layer 13 of the honeycomb structural body 1, as shown in FIG. 6, in order to perform the sound detection of the whole circumference of the skin layer 13 of the honeycomb structural body 1.

The detection process previously described detected sounds of air leaking from the skin layer 13 of the honeycomb structural body 1 (which corresponds to four test examples 1 to 4 having defects, i.e. holes having a different size) and the honeycomb structural body 1 without any defects (which corresponds to the comparison sample 5). Because the detected sounds of leaking air have a large magnitude when the microphone becomes close to defects formed in the skin layer 13 of the honeycomb structural body 1, the maximum magnitude of the detected sounds of leaking air in each of the test examples 1-4 and the comparison sample was detected. The exemplary embodiment produced thirty samples for each of the test examples 1-4 and the comparison example 5, and detected the sounds of air leaking from the skin layer 13. The exemplary embodiment calculated an average value of the maximum magnitude of the detected sounds for each of the test examples 1-4 and the comparison example 5. Table 1 shows the detection results. In Table 1, reference character "x" indicates that a honeycomb structural body contains defects and has a large magnitude of the detected sounds of air leaking from or through its skin layer. Reference character "○" indicates that a honeycomb structural body contains no defects and has a small magnitude of detected sounds of air leaking from or through its skin layer.

TABLE 1

| Example No. | 1 | 2 | 3 | 4 | 5 |
|---|---|---|---|---|---|
| Diameter Φ (mm) of defects (holes) | 0.07 | 0.09 | 0.12 | 0.2 | — |
| Magnitude (dB) of sounds of air | 63 | 66 | 67 | 67 | 28 |
| Judgment result | X | X | X | X | ○ |

As can be understood from the results shown in Table 1, the detected sounds of air leaking from the skin layer with defects of the test examples 1-4 has a large magnitude when compared with that of the comparison example 5 having the skin layer without any defect. This makes it possible to reliably detect defects, i.e. holes having a diameter of not less than 0.07 mm.

In the exemplary embodiment previously described, both the end sections 14 and 15 of the honeycomb structural body 1 are sealed and the gas 3 such as air is supplied from the end section 14 to the end section 15 along the gas supply direction X as the axial direction of the honeycomb structural body 1 (see FIG. 4). Because the honeycomb structural body 1 is made of porous ceramics, the gas 3 can pass through the cell wall 11 and the skin layer 13, and the gas 3 leaks through the skin layer 13 to the outside of the honeycomb structural body 1 when the gas 3 is supplied to the inside of the honeycomb structural body 1. The microphones 2 arranged around the outer periphery of the skin layer 13 detect sounds of the gas 3 leaking from or through the skin layer 13 of the honeycomb structural body 1. When defects, i.e. holes or cracks formed in the skin layer 13, a magnitude of detected sounds of air leaking from the holes formed in the skin layer 13 becomes large. It is therefore possible to correctly detect the presence of defects formed in the skin layer 13 of the honeycomb structural body 1 on the basis of the detected sounds of leaking air.

In the exemplary embodiment, a plurality of the microphones 2 are arranged around the outer periphery of the honeycomb structural body 1 along the whole length of the gas supply direction X. The honeycomb structural body 1 is rotated in the circumferential direction R of the honeycomb structural body 1 by not less than one revolution around the central axis of the honeycomb structural body 1. The presence of defects formed in the skin layer 13 is detected on the basis of the comparison results in magnitude of detected sounds of leaking air. This makes it possible to detect the presence of defects around the whole circumference of the skin layer 13 of the honeycomb structural body 1. Because a magnitude of detected sounds of air leaking from or through defects becomes large when compared with that leaking from the skin layer without any defect, it is possible to correctly detect the presence of defects formed in the skin layer 13 of the honeycomb structural body 1 on the basis of the magnitude of detected sounds of leaking air.

It is preferable to supply gas 3 (i.e. air) having a specified pressure of not less than 0.1 MPa to the inside of the honeycomb structural body 1 during the defect detection step. This makes it possible for microphones 2 to easily detect sounds of air leaking from the skin layer 13 of the honeycomb structural body 1 during the defect detection step.

When the supplied gas 3 has a pressure of less than 0.1 MPa, there is a possible difficulty of correctly detecting sounds of air leaking from defects formed in the skin layer 13 of the honeycomb structural body 1 because a magnitude of the detected sounds of the leaking air becomes small.

It is preferable to supply the gas 3 having the specified pressure of not more than 1.5 MPa to the inside of the honeycomb structural body 1 during the defect detection step in view of preventing occurrence of breakage of the honeycomb structural body 1.

Further, as shown in FIG. 4, it is preferable for the air balloons 46 and 43, which are fluctuated by supplied air to support the outer periphery of both the end sections 14 and 15 of the honeycomb structural body 1 in order to seal both the end sections 14 and 15 of the honeycomb structural body 1. This structure makes it possible to completely seal the honeycomb structural body 1, and it is further possible to easily arrange the microphones 2 around the outer periphery of the honeycomb structural body 1 because the honeycomb structural body 1 is fixed to a specified location.

If the honeycomb structural body 1 is supported by a small pressure of the air balloon chuck device 4 when compared with the specified pressure range previously described, there is a possible difficulty of leaking air from the honeycomb structural body 1 other than the skin layer 13, and a possible decrease of a magnitude of detected sounds of air leaking from the skin layer 13.

On the other hand, if the honeycomb structural body 1 is supported by a large pressure of the air balloon chuck device 4 when compared with the specified pressure range previously described, there is a possible breakage of the honeycomb structural body 1. Accordingly, it is possible to support the honeycomb structural body 1 by the specified pressure range of 0.1 to 0.5 MPa.

The concept of the method according to the present invention is not limited by the exemplary embodiment previously described. It is possible for the method according to the present invention to correctly and reliably detect the defects formed in a honeycomb structural body which is different in structure, i.e. a dimension, a volume and a cell structure from the honeycomb structural body 1. For example, the method according to the present invention had detection results which are the same detection results shown in Table 1 when detecting the presence of defects formed in a honeycomb structural body a diameter φ of 103 mm, an axial length (a whole length) L of 130 mm and a volume of about 1100 cc, and a honeycomb structural body having a diameter φ of 129 mm, an axial length (a whole length) L of 100 mm and a volume of about 1000 cc.

Still further, the method according to the present invention uses the air balloon chuck device 4 in order to support and seal a honeycomb structural body. However, the concept of the method according to the present invention is not limited by this manner. It is acceptable for the method to use another device capable of reliably seal and support a honeycomb structural body during the defect detection step.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A method of detecting defects generated in a honeycomb structural body comprised of a plurality of cell walls arranged in a lattice shape and with a skin layer, the cell walls being arranged to form a plurality of cells, each of the cells having a polygonal shape in a cross section of the honeycomb structural body perpendicular to a gas supply direction, and an outer peripheral surface of the honeycomb structural body being covered with the skin layer, the method comprising steps of:
   sealing both end sections of the honeycomb structural body;
   supplying gas from one end section to the other end section of the honeycomb structural body;
   detecting sounds of gas leaking from the skin layer of the honeycomb structural body by using one or more microphones arranged at an outer periphery of the skin layer; and
   judging a presence of defects such as holes having a predetermined diameter and cracks generated in the skin layer on the basis of a detected magnitude of sounds of the leaking gas;
   wherein in the sealing step, balloons hold and support the outer periphery near to the end sections of the honeycomb structural body in order to seal both the end sections of the honeycomb structural body by using the balloons.

2. The method of detecting defects of the honeycomb structural body according to claim 1, wherein in the sealing step, the balloons hold and support both the end sections of the honeycomb structural body by a pressure within a range of 0.1 to 0.5 MPa.

3. The method of detecting defects of the honeycomb structural body according to claim 1, wherein
   the one or more microphones are arranged parallel to a cell formation direction in the honeycomb structural body around the outer periphery of the skin layer of the honeycomb structural body, and
   in the detection step of detecting sounds of gas leaking from the skin layer of the honeycomb structural body, and the honeycomb structural body and the one or more microphones are rotated relatively to each other along a peripheral direction of the skin layer by not less than one rotation, and
   the judgment step compares a relative strength of sounds of gas leaking from the honeycomb structural body during the relative rotation of the honeycomb structural body and the one or more microphones, and judges whether or not defects are generated in the honeycomb structural body on the basis of the comparison results.

4. The method of detecting defects of the honeycomb structural body according to claim 3, wherein
   in the detection step, the gas has a pressure of not less than 0.1 MPa and is supplied to the inside of the honeycomb structural body.

5. The method of detecting defects of the honeycomb structural body according to claim 4, wherein in the sealing step, the balloons hold and support both the end sections of the honeycomb structural body by a pressure within a range of 0.1 to 0.5 MPa.

6. The method of detecting defects of the honeycomb structural body according to claim 3, wherein
   in the detection step, the honeycomb structural body is rotated around the one or more microphones along the peripheral direction of the skin layer by not less than one rotation.

7. The method of detecting defects of the honeycomb structural body according to claim 3, wherein
   in the detection step, the one or more microphones are rotated around the peripheral direction of the skin layer of the honeycomb structural body by not less than one rotation.

8. A method of detecting defects generated in a honeycomb structural body comprised of a plurality of cell walls arranged in a lattice shape and with a skin layer, the cell walls being arranged to form a plurality of cells, each of the cells having a polygonal shape in a cross section of the honeycomb structural body perpendicular to a gas supply direction, and an outer peripheral surface of the honeycomb structural body being covered with the skin layer, the method comprising steps of:
   sealing both end sections of the honeycomb structural body;
   supplying gas from one end section to the other end section of the honeycomb structural body;
   detecting sounds of gas leaking from the skin layer of the honeycomb structural body by using one or more microphones arranged at an outer periphery of the skin layer; and
   judging a presence of defects such as holes having a predetermined diameter and cracks generated in the skin layer on the basis of a detected magnitude of sounds of the leaking gas; wherein:
   in the detection step, the gas has a pressure of not less than 0.1 MPa and is supplied to the inside of the honeycomb structural body; and
   in the sealing step, balloons hold and support the outer periphery near to the end sections of the honeycomb structural body in order to seal both the end sections of the honeycomb structural body by using the balloons.

9. The method of detecting defects of the honeycomb structural body according to claim 8, wherein in the sealing step, the balloons hold and support both the end sections of the honeycomb structural body by a pressure within a range of 0.1 to 0.5 MPa.

* * * * *